W. CUSTER.
Plow Fender.
No. 83,259.
Patented Oct. 20, 1868.
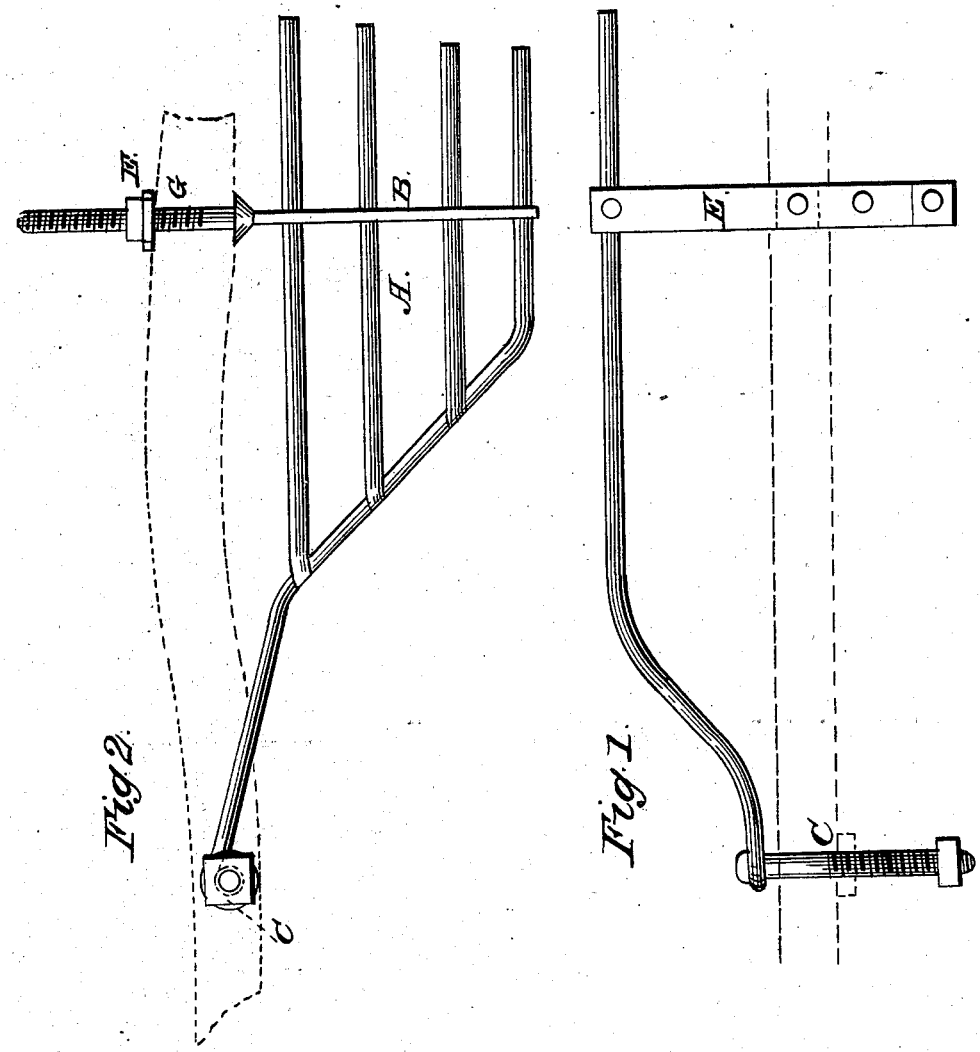
Witnesses
J. H. Smith
N. P. Aupman
Inventor.
William Custer
Chipman Hosmer & Co
Attys

WILLIAM CUSTER, OF SHANNONDALE, INDIANA.

Letters Patent No. 83,259, dated October 20, 1868.

IMPROVEMENT IN CULTIVATORS.

The Schedule referred to in these Letters Patent and making part of the same.

*To whom it may concern:*

Be it known that I, WILLIAM CUSTER, of Shannondale, in the county of Montgomery, and State of Indiana, have invented a new and valuable improvement in means for shielding corn and other growing plants from clods and stones, while the same is being cultivated by a plow; and I do hereby declare that the following is a full, clear, and exact description of the construction and operation of my device, reference being had to the accompanying drawings, and to the letters and figures of reference marked thereon, said drawings being designed to form a part of this, my specification.

The object of my invention is to provide means for preventing clods of earth and boulders from being cast upon growing corn or other plants by a plow, while the process is being carried on in cultivation commonly called "plowing between the rows."

Figure 1 of the drawings is a perpendicular view of my device, and

Figure 2 is a side view thereof, attached to the plow.

The letter A represents the main body of my device. It is formed of three or more fingers, joined at one end to a long crooked bar, as shown, and which fingers, in conjunction with said bar, form a shield, against which clods and stones thrown outward by the plow shall be caught, and prevented from falling upon the growing plants.

Letter B is a cross-bar, through which all the fingers of the shield are passed, as shown on fig. 2. Said cross-bar extends upward to a point above the plow-beam, where it passes through and is secured in the bar E, next mentioned.

The bar E is constructed in the form shown on fig. 1, and the openings therein are designed to receive the bolt G next mentioned.

The bolt G has a swivel-head, and thread and nut, as represented, and is designed to pass perpendicularly through the plow-beam, at a point immediately in the rear of the plow-bolt, and it also passes through one of the openings in the bar E, on the top of the plow-beam, and is secured there by the nut and thread before mentioned.

By means of these last-named devices, the operator can adjust the shield at such distance from the plow-beam as may be desirable.

The letter C is a bolt, with a nut, screw, and head thereon, as shown. It is adjusted in the front end of the plow-beam, in the rear of the clevis, and, in combination with the bar B, holds the shield in its proper position for service.

My shield, when thus attached to the plow-beam, is drawn along on or near the ground, and always serves as a protection to the growing plants against the loosened clods and stones, as above mentioned, by keeping such clods and stones between the plants and the plow-share.

What I claim as my invention, and desire to secure by Letters Patent, is—

A shield or fender-attachment to a plow, constructed and operating substantially as herein specified, and for the purposes mentioned.

WILLIAM CUSTER.

Witnesses:
JESSE JACKSON,
JESSE CUSTER.